Patented Nov. 3, 1931

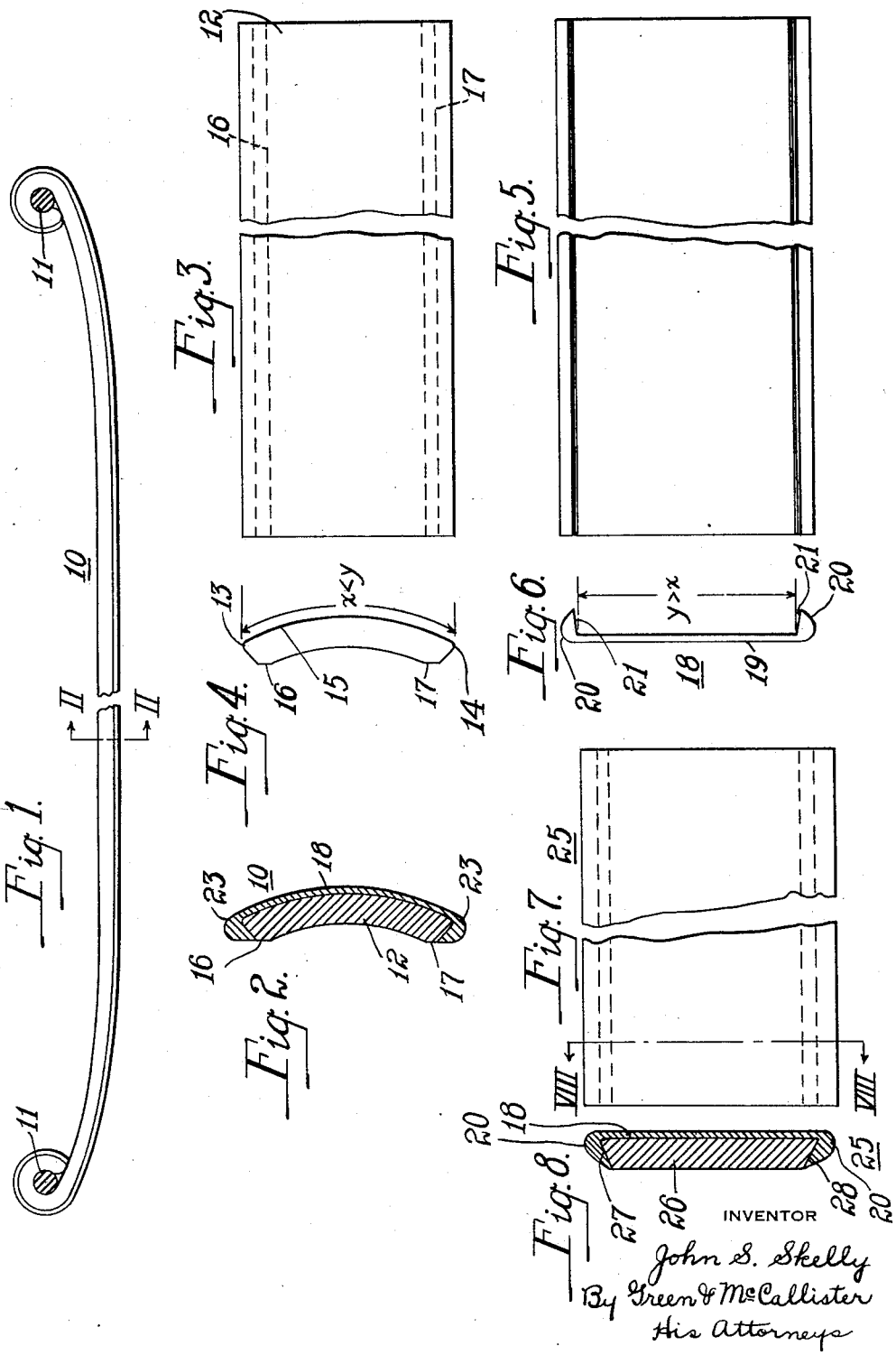

1,829,966

UNITED STATES PATENT OFFICE

JOHN S. SKELLY, OF MONONGAHELA, PENNSYLVANIA

IMPACT BAR FOR AUTOMOBILE BUMPERS

Application filed June 6, 1930. Serial No. 459,509.

This invention relates to impact bars such as provided for bumpers of automobiles and the like.

Heretofore, impact bars for automobiles have been made in various forms and by various methods of manufacture. It has been the object to produce, by these methods, impact bars having sufficient resiliency and strength and at the same time some degree of beauty and neatness of appearance.

In order to obtain the necessary resiliency and strength and some degree of beauty or ornamentation, bumper bars have been made from spring steel which is tempered either before or after the ornamentation has been applied thereto. The tempered spring steel bar provides the necessary resiliency and strength required to absorb shock or forces of impact.

Impact bars of the type referred to above have been beautified in different manners; such as by nickel and chromium plating; or by attaching thin strips of stainless steel or rustless iron, or thin strips which have been nickel plated or chromium plated, to the front or dress faces of the bars.

Bumper bars made from spring steel, subsequently nickel or chromium plated, have not been satisfactory because the nickel peels off and is easily stained and chromium plating is too expensive when properly applied, otherwise the chromium plate does not have the necessary lasting qualities. Unless chromium plating is carefully and expertly done, it peels or breaks off thereby destroying the appearance of the bumper bars.

Bumper bars made from bars of raw steel having thin sheets or strips of rustless iron or stainless steel attached to the front faces thereof before tempering are not practical because the spring steel bars cannot be properly tempered as the exposed or uncovered part cools more quickly than that part covered by the thin ornamental sheet or strip.

An object of this invention is to provide an ornamental cover of stainless steel, rustless iron or non-corrosive metal of such shape and construction that the cover, when in place on a bar of previously tempered spring steel forms, for practical purposes, an integral part of the bar.

Another object of the invention is to provide a composite bumper bar formed of previously tempered spring steel and an ornamental member of stainless steel, rustless iron or non-corrosive metal, of such shape and construction that, when in place on the spring steel bar, it forms for all practical purposes, an integral part of the main spring steel bar.

A further object of the invention is the provision of a composite bumper bar in which the ornamental part shall not become loose or torn from the main or steel spring part of the bumper bar when said composite bar is subjected to severe shocks or impacts.

A still further object of the invention is the provision of a new and improved method of making composite bumper bars, one part of which provides the necessary resiliency and strength to withstand severe shocks and impacts and another part of which provides the ornamentation, neatness of appearance and imparts beauty to the bumper.

Other objects of the invention will, in part, be apparent and will, in part, be obvious from the following description taken in conjunction with the accompanying drawings in which:

Figure 1 is a top plan view of a composite bumper bar arranged and constructed in accordance with one embodiment of the invention;

Fig. 2 is a view in section taken on line II—II of Fig. 1;

Fig. 3 is a view in elevation of the front face of a spring steel bar forming part of the composite impact bar;

Fig. 4 is an end view of the bar shown in Fig. 3;

Fig. 5 is a top plan view of an ornamental member of substantially channel shape which forms part of the impact bar shown in Figs. 1 and 2;

Fig. 6 is an end view of the ornamental member shown in Fig. 5;

Fig. 7 is a fragmentary view of a modified form of composite bumper bar arranged and constructed in accordance with the invention; and Fig. 8 is a view in section taken on line VIII—VIII of Fig. 7.

Throughout the drawings and the specification like reference characters indicate like parts.

In Fig. 1 of the drawings a composite bumper bar 10 is shown the opposite ends of which are curled or bent to form eyes through which bolts 11 may be passed to secure the composite bar in operative position on a bumper for automobiles or like vehicles.

The composite bumper bar 10 comprises a previously tempered spring steel main bar 12 which is of arcuate form in transverse section as indicated in Figs. 2 and 3. The top and bottom edges of the spring steel bar 12 are of substantially V-shape as shown more particularly in Figs. 2 and 4. The apexes 13 and 14 of the V-shape edges terminate substantially flush with the front face or surface 15 of the bar.

Stated in another way, it may be said that the top and bottom edges of the spring steel bar 12 are beveled from the front face or surface 15 towards the longitudinal center line of the bar. By so beveling the top and bottom edges of the main bar, these edges are of substantially V or wedge shape. On the inner face of the bar 12 substantially flat surfaces 16 and 17 are provided that extend longitudinally of the bar as indicated by broken lines in Fig. 3.

The outer face of the composite bar 10 is covered with an ornamental member 18 of substantially channel shape (see Figs. 5 and 6). The ornamental member 18 is preferably rolled from stainless steel or rustless iron, although other non-corrosive metals may be employed that are suitable for the purpose. The ornamental channel member 18, if made from stainless steel or rustless iron, provides a polished front or dress face for the composite bar 10 which by virtue of its composition resists corrosion and therefore retains its brightness without the necessity of cleaning and polishing.

The channel member 18 has a web portion 19 and flanges 20 of substantially V-shape in transverse section. When the member 18 is mounted or secured in place on the spring steel bar 12, the flanges 20 fit snugly or closely over the V or wedge-shape edges 13 and 14 of the spring steel bar.

The flanges 20, as shown, are materially thicker than the web portion 19 and the inner faces 21 thereof are substantially straight and practically perpendicular to the inner face of the web. The outer faces of the flanges are cylindrical, curved or convex having a radius substantially equal to the depth of the flanges on their inner faces. Since the flanges 20 are materially thicker than the web, the flanges have such strength and rigidity that the ornamental channel member 18 will be held positively in place on the bar, as shown in Fig. 2, even though the composite bar is subjected to severe strains, shocks or impacts.

The flanges 20 being cylindrical, curved or convex on their outer faces, the upper edges thereof are substantially V-shape in section and when the channel member is in place on the main spring steel bar 12, the outer faces of the flanges 20 form substantially a continuation of the plain or straight surfaces 16 and 17 on the inner face of the bar 12.

As shown in Figs. 4 and 6, the distance Y, measured between the inner faces 21 of the flanges 20, is greater than the distance between the extremities of the V or wedge-shape edges 13 and 14 measured along the outer face of the bar 12.

The channel member 18 may be attached to the spring steel bar 12 in the manner indicated in Fig. 2 by placing it over the front face or surface of the bar. The web 19 of the channel member is then so bent as to conform to the outer arcuate surface of the bar 12 and the flanges 20 are bent, folded or clinched over the top and bottom edges 13 and 14. Since the distance Y between the inner faces 21 of the flanges 20 is greater than the arcuate distance between the extreme points of the top and bottom edges 13 and 14, the bending of the channel member that takes place when the flanges 20 are bent, clinched or folded over the top and bottom edges 13 and 14 of the bar 12, occurs at about the point where the top and bottom edges 13 and 14 contact with or engage the channel member 18. As shown in Fig. 2, the place of bending takes place approximately in the region designated by numerals 23. Since the flanges 20 are of materially greater thickness than the thickness of the web 19, the flanges have such strength and rigidity as to resist bending or crumbling when the composite bar 10 is subjected to severe strains, shocks or impacts.

When the channel member 18 is secured to the bar 12 in the manner shown in Fig. 2, said channel member forms for all practical purposes an integral part of the main or spring steel bar 12.

In Figs. 7 and 8 of the drawings a composite impact bar 25 is shown. The impact bar 25 comprises a previously tempered spring steel bar 26, the outer and inner faces of which are substantially parallel to each other. In other words, the bar 26 is substantially straight in transverse section whereas the bar 12 forming part of the composite impact bar 10 is substantially arcuate on its inner and outer faces. The top and bottom edges of the bar 26 are of V or wedge shape as indicated at 27 and 28, and may be of substantially the same form as the top and bottom edges of the spring steel bar 12.

The outer face of the bar 26 may be covered with the ornamental channel member 18 in the manner set forth in connection with the description of the composite bar 10.

The method of making the composite bars 10 and 25 may be stated briefly as providing a rolled raw steel spring bar, tempering the bar to thereby impart to said bar the proper resiliency and strength, providing a rolled ornamental member of channel shape from metal such as stainless steel, rustless iron or non-corrosive metal, forming flanges on the channel shape having materially greater thickness than the connecting web thereof, placing the channel over the front face of the previously tempered bar and folding or clinching the flanges of the channel member over the top and bottom edges of the spring steel or main bar.

It has been found in practice that the main or spring steel bar cannot be properly tempered if the ornamental member is attached to it before tempering. This is true because the inner face of the spring steel bar is exposed while the outer face would be covered by the ornamental member; therefore, the spring steel bar would not cool uniformly and the temper would be non-uniform throughout the body of the bar.

By providing a spring steel bar, such as shown in the drawings, from raw steel and then tempering it to the proper degree, the bar will have the necessary physical qualities to withstand shocks and impacts. Having thus obtained a bar having the desired physical properties, the ornamental member may be permanently attached thereto without detracting from those physical properties necessary to render the spring steel bar efficient for its purpose.

By shaping the top and bottom edges of the main or steel spring bar in the form of a wedge or V and forming an ornamental member of channel shape having materially thicker flanges than the connecting web and by making the distance between the inner faces of the flanges greater than the distance between the extremities of the top and bottom edges of the main bar, the web portion of the channel member may be bent adjacent to the thickened flanges so that the flanges, when in operative position, as shown in Figs. 2 and 8, are not deformed. The flanges, not being deformed, will, therefore, provide the necessary strength and stiffness to prevent the channel member being knocked off or torn from the main or steel spring bar when subjected to severe strains, impacts or shocks.

While various modifications and changes may be made in the impact bars herein shown and described without departing from the spirit and the scope of the invention, it is to be understood that only such limitations shall be placed on the invention as are imposed by the prior art and the appended claims.

What I claim as new and desire to secure by Letters Patent is:

1. The method of making bumper bars that consists in providing a spring steel body part, tempering said body part, providing a channel member of metal having flanges of greater thickness and rigidity than the web thereof, placing said channel member on the front face of the body part, and then pressing the flanges of the channel member over the edges of the body part.

2. The method of making bumper bars having a body part of spring steel and an ornamental or dress face part of metal, that consists in rolling the body part from spring steel stock, tempering said body part, rolling a channel member from metal to provide an ornamental or dress face part having flanges of greater thickness and rigidity than the web thereof, pressing the channel member on the front face of the spring steel body part and clinching the flanges thereof over the edges of the spring steel part.

3. A composite bumper bar comprising a main bar of previously tempered spring steel having edges of substantially V-shape, and an ornamental member of channel shape having flanges of substantially V-shape, said flanges being bent or clinched over the V-shape edges of the main bar to thereby lock the members of the composite bar together.

4. A composite bumper bar comprising a main bar of previously tempered spring steel having top and bottom edges of substantially V-shape, one leg of each said V-edges forming an unbroken continuation of the front face of said bar, and an ornamental channel member, of non-corrosive material, having flanges of substantially V-shape folded over the V-shaped edges of said bar to lock said ornamental member permanently in position on the main bar, the flanges of said channel member being materially thicker at their bases than the connecting web thereof.

5. An ornamental member for bumper bars comprising a rolled channel shape of non-corrosive metal having flanges the inner faces of which are substantially straight and the outer faces of which are substantially cylindrical.

6. A composite bumper bar comprising a main bar of previously tempered spring steel having top and bottom edges beveled from the outer faces thereof towards the center thereof, and an ornamental member of substantially channel shape permanently secured to the outer face of said main bar, said channel member having a web of greater width between the inner faces of its flanges than the distance between the extremities of the top and bottom edges of the main bar measured along the outer face thereof, said flanges being substantially straight on their inner faces and cylindrical on their outer faces, said flanges being clinched over the beveled edges of the main bar to securely lock the members of the composite bar permanently in position.

7. A composite bar comprising a main bar of previously tempered steel, said bar having top and bottom edges of substantially V-shape with the apexes thereof lying substantially in the plane of the outer face of said bar, and an ornamental member of channel shape permanently secured to the main bar by the flanges thereof which are folded over the V-shape edges of said main bar, said flanges being farther apart at their inner faces than the distance between the apexes of the V-shape edges of the main bar measured along the outer face thereof, and the flanges of said channel member being thicker at their bases than the connecting web thereof.

8. A facing member adapted to be attached to the front face of a bumper bar of spring steel comprising a channel member having a web or body portion and flanges of greater thickness and rigidity than the web or body portion adapted to be clinched over the edges of the bumper bar to lock said members together.

9. A facing member adapted to be attached to the front face of a bumper bar of spring steel that comprises a channel member of metal having a relatively thin web or body portion and flanges of materially greater thickness than the web or body portion.

10. A facing member adapted to be attached to the front face of a bumper bar of spring steel that comprises a channel member of metal having a relatively thin web or body portion and flanges, said flanges being of materially greater thickness at their juncture with the web than the web portion.

11. A bumper bar comprising a body member of spring steel, and a facing member attached thereto to cover the front face of said spring steel body member, said facing member being of channel shape and having flanges of materially greater thickness than the web portion, said flanges being bent or clinched over the edges of the spring steel body portion to thereby hold the facing member and body member positively in engagement and to prevent separation of the body and facing members.

12. An impact bar for vehicle bumpers comprising a composite bar formed of a main bar of tempered spring steel and an ornamental channel member superimposed on the main bar, said channel member having flanges of greater thickness and rigidity than the web thereof folded, bent or clinched over the edges of the main bar to lock the members of the composite bar together.

13. An impact bar for automobile bumpers comprising a composite bar formed of a main bar having top and bottom edges of substantially V-shape, and an ornamental facing member superimposed on said main bar, said facing member comprising a rolled channel shape having flanges of greater thickness than the web thereof, folded, bent or clinched over the V-shape edges of the main bar to lock the composite members of the bar together.

14. An impact bar for automobile bumpers comprising a composite bar formed of a main bar of previously tempered spring steel, and an ornamental facing member superimposed on the main bar, said facing member comprising a rolled channel shape of metal having flanges of materially greater thickness and rigidity than the web thereof, for engaging the longitudinal top and bottom edges of the main bar to lock the members of the composite bar together.

15. A composite bar for impact members of automobile bumpers comprising a bar of previously tempered spring steel and a rolled channel shape of metal having flanges of greater thickness and rigidity than the web thereof folded, clinched or bent over the edges of the main bar for permanently fastening said members of the composite bar together.

16. A composite impact bar comprising a main bar of previously tempered spring steel having top and bottom edges of wedge-shape, and an ornamental channel member of metal having flanges of greater thickness and rigidity than the connecting web thereof, so designed and shaped that when the flanges are formed over the wedge-shape edges of the main bar said channel member forms, for practical purposes, an integral part of the main bar.

17. An ornamental member for bumper bars comprising a rolled channel shape having flanges the inner faces of which are substantially straight and the outer faces of which are curved.

18. A composite bumper bar comprising a main bar of previously tempered spring steel having top and bottom edges beveled from the outer faces thereof towards the center thereof, and an ornamental member of substantially channel shape permanently secured to the outer face of said main bar, said channel member having a web of greater width between the inner faces of its flanges than the distance between the extremities of the top and bottom edges of the main bar measured along the outer face thereof, said flanges being substantially straight on their inner faces and substantially convex on their outer faces, said flanges being clinched over the beveled edges of the main bar to securely lock the members of the composite bar permanently in position.

In testimony whereof, I have hereunto subscribed my name this 29th day of May, 1930.

JOHN S. SKELLY.